Figure 1:
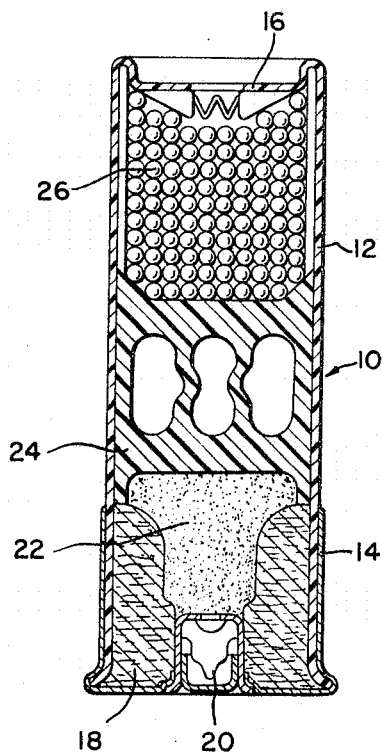

July 25, 1967     T. A. OLSON ET AL     3,332,352

COATING FOR PLASTIC SHOTSHELLS

Filed Nov. 24, 1965

Inventors:
Theodore A. Olson,
Edward A. Rickey,
Albert A. Schilling by John N Lewis Jr.
John W. Phipps
Nicholas Skovran
Attorneys

United States Patent Office 3,332,352
Patented July 25, 1967

3,332,352
COATING FOR PLASTIC SHOTSHELLS
Theodore A. Olson, Trumbull, and Edward A. Rickey and Albert A. Schilling, Stratford, Conn., assignors to Remington Arms Company, Inc., Bridgeport, Conn., a corporation of Delaware
Filed Nov. 24, 1965, Ser. No. 509,577
12 Claims. (Cl. 102—43)

This invention relates to an improved silicone mixture which can be applied as a heavy duty protective coating for difficult corrosion inhibiting applications.

More specifically, the invention relates to plastic ammunition and the providing of a silicone coating therefor to eliminate objectionable gun chamber build-up and corrosion.

With the widespread and increasing use of shotgun shells made with plastic body casings, various functional problems in regard to the firearms which use these plastic shotshells have become evident. For example, it has been found that with the rapid and continuous firing of plastic body shotshells, there is a tendency to build up deposits in the chamber of the gun. Moreover, the formation of deposits may interfere with shell extraction and promote corrosion, particularly under moist atmospheric conditions.

The build-up residue may consist of ink, fibrous materials, burned and unburned powders, products of combustion, plastic materials, and metallic particles. This is particularly troublesome with shooters who do not clean their guns after use. It should be appreciated, of course, that the degree of corrosion is related to the quality of the metal used in the gun barrel and that some metals resist corrosion better than outhers.

A wax coating treatment of the plastic shotshell bodies was developed and was believed to have overcome this problem. However, experience has shown that although the wax coating prevents chamber corrosion, it does not completely assure protection against chamber build-up. Some of the difficulties were shown to be related to manufacturing processing techniques, which cannot always be readily controlled. Accordingly, it became necessary to develop other effective methods which are less dependent upon processing techniques and which would prevent corrosion as well as eliminate chamber build-up.

It has been found that polysiloxane dispersion or solution can be applied to the exterior of a plastic shotshell body which will eliminate any tendencies for gun chamber build-up and will protect the gun chamber against corrosion as well as prevent shell extraction problems attributed to adverse chamber conditions.

It should be mentioned here that the terms "silicone", "silicone fluids" or "silicone mixture" are used in this application, we refer to a polysiloxane compound containing methyl radicals only, such as General Electric SF–96 or methyl-phenyl radicals, such as General Electric SF–1017 and SF–1038 as explained in Technical Data Books S–9B, S–10A, S–24 published by the "General Electric Silicone Products Department," Waterford, New York, Silicone fluid SF–1017 has about 50 mole percent of methyl radicals and about 50 mole percent phenyl radicals while SF–1038 has about 86 mole percent methyl and about 14 mole percent phenyl. The preferred silicon fluid and the one to which we will refer to mainly throughout the remaining portion of this specification is a dimethyl polysiloxane fluid, the formula of which is shown in the literature (Tech. Data Book S–9B) to be:

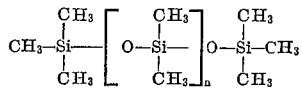

In addition to improved gun chamber protection, the use of silicone fluid mixture as a shotshell coating has several added advantages. These are as follows:

(1) The coating does not require a drying process and can be applied by standard roller-coating techniques.

(2) It is a transparent coating which can be applied directly over wet printing ink without producing any adverse effects.

(3) The investment cost for equipment is minimized.

(4) Required processing skills are at a minimum.

It is therefore an object of this invention to provide and improved silicone mixture which is effective as a coating for difficult corrosion inhibiting applications. It is another object of this invention to provide a coating on a plastic body shotshell which will effectively eliminate gun chamber build-up and corrosion associated with the firing of plastic body shotshells.

Figure 2:
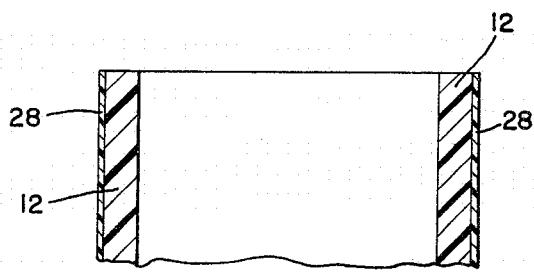

Other objects and advantages will be apparent from the following description and accompanying drawings in which:

FIGURE 1 shows a conventional plastic body shotshell to which the invention can be applied; and FIGURE 2 shows an enlarged view of the plastic body with an exaggerated coating shown thereon.

Referring to the drawings, FIGURE 1 shows a shotgun shell 10 having a plastic body 12 with a rear metal head 14 and a crimped forward mouth end 16. A base wad 18 is attached within the shotshell at its rear end and a battery-type primer 20 inserted therein. Propellant means 22 is positioned adjacent the base wad and primer and rearwardly of a combination wad column and shot liner 24. Shot pellets 26 are inserted within said wad column-shot liner 24.

The shotshell described above is a conventional load on the market today. It should be appreciated, however, that applicants' invention has utility in other combinations as well as the load described above. Thus, applicants' invention could have utility in an all-plastic shotshell which could have no metal head, shot containers, or even separate base wads, as well as other plastic ammunition.

Several approaches involving silicone as the protective agent have been developed including the preferred method which requires the application of a thin coating of a polysiloxane fluid mixture 28 to the loaded shotshell directly after the loading and printing operation.

In evaluating the use of silicone fluids as described above, it was found that silicone being inert and having a very small change of viscosity with temperature change and a wide range of viscosities provides excellent protection against chamber build-up, but very little protection against chamber corrosion. These characteristics are opposite to those produced by the wax coating treatment mentioned above. Various anti-corrosion agents, including amines, anhydrides, and phenols, recommended by major silicone producers were tried without achieving the desired results. After considerable effort, three additives were found to be effective in preventing chamber corrosion without affecting the protection provided by silicone against chamber build-up.

(1) Naphthenic acid ($C_6H_{11}COOH$).—This is a class of acids derived from petroleum, particularly that of a non-paraffinic character. By itself, this additive does not function sucessfully as a corrosion inhibitor. However, it was found that by adding a quantity of wax to a mixture of dimethyl silicone and naphthenic acid, a stable dispersion can be formed which can be applied to the shotshell plastic body so that the desired protection against corrosion is achieved without impairing its ability to prevent chamber build-up. The unexpected favorable result obtained from the dimethyl silicone-napthenic-wax dispersions is believed to be due to the excellent film-forming characteristics of the naphthenic acids.

Naphthenic acid was also tried with methyl-phenyl silicone fluid alone (about 17% napthenic acids and about 83% methyl-phenyl silicone fluids). The resulting mixture was a solution rather than a dispersion and the performance with regards to chamber build-up and corrosion was favorable.

(2) *Oleic acid* $CH_3(CH_2)_7CH:CH(CH_2)_7COOH$.—This is defined as a mono-unsaturated fatty acid which in its commercial state is derived mostly from animal tallow or natural vegetable oils. This additive was found to be effective when combined with dimethyl silicone fluid without the addition of wax. However, it was found that a quantity of wax is necessary in order to produce a stable dispersion of oleic acid and dimethyl silicone fluid, said stable dispersion being necessary in a high production manufacturing process. However, if means are provided to keep the dispersion agitated during the manufacturing process, the wax can be eliminated.

Oleic acid (about 15%), when mixed with about 85% methyl-phenyl silicone fluid, resulted in a solution instead of a dispersion because of the greater solvent power of the methyl-phenyl silicone fluid. However, the solution tends to produce a gummy coating on the gun chamber surface so that the overall performance of the oleic-methyl-phenyl silicone solution, although being much better than no coating, was not quite as good as the preferred lanolin-silicone coatings explained below.

(3) *Lanolin oil*.—This is a common fat obtained from the wool of sheep—a cholesterol ester of a fatty acid. Whereas naphthenic acid and oleic acid are organic acids, lanolin is an ester of an organic acid. Also, as with the oleic acid, lanolin was found to be effective when mixed with dimethyl silicone fluid. However, it was found again that wax was necessary to produce a stable dispersion of lanolin and dimethyl silicone fluid.

Lanolin was also found to be effective with methyl-phenyl silicone fluid with and without wax, the wax being added preferably to provide a stable dispersion to facilitate manufacturing. Thus, 16% lanolin and 84% methyl-phenyl silicone produced approximately equal results as 16% lanolin, 2% paraffin wax, and 82% methyl-phenyl silicone although not as good as the preferred mixture of 16% lanolin, 2% paraffin wax, and 82% dimethyl silicone.

All three additives, i.e., naphthenic acids, oleic, and lanolin have an important film-forming characteristic which enhances their usefulness as lubricants. This characteristic is especially important when the lubricant is to be used under extreme pressure conditions such as in a shotgun chamber.

The preferred dispersions were found to be as follows:

*Dimethyl General Electric SF–96*

|  | Percent |
|---|---|
| (1) Naphthenic acids | 17 |
| Paraffin wax | 17 |
| Silicone | 66 |
| (2) Oleic acid | 15 |
| Paraffin wax | 8 |
| Silicone | 77 |
| (3) Lanolin | 16 |
| Paraffin wax | 2 |
| Silicone | 82 |

Although these preferred dispersion percentages gave the best results, other percentages gave improved results although they were not as good as the cited percentages.

Although the discussion above refers to plastic body shotshells, it must be appreciated that the invention has other uses also. In addition to being capable of being used with any plastic centerfire, rimfire, or electrically fired shells, it has been suggested that the silicone mixture would be well suited to coat the outside surfaces of guns at the factory to provide a heavy-duty finish against corrosion due to gun handling and adverse storing conditions. Surface corrosion of guns on display in gun shops, stores, etc., due to customer handling, is known to be another troublesome problem.

What is claimed is:

1. A plastic cartridge casing having a rear head portion and a front mouth portion, a propellant charge contained in said tubular casing adjacent said head portion to explosively expel projectile means from said casing mouth portion upon ignition of said propellant charge, and a silicone mixture coating applied to the outer periphery of the plastic cartridge casing which upon firing of the propellant charge becomes fluidized and transfers to the associated gun chamber to effectively prevent gun chamber build-up and corrosion.

2. A plastic cartridge casing as recited in claim 1 wherein said silicone mixture coating comprises a major portion of one of the group of silicone fluids consisting of polysiloxane fluids having methyl radicals only, and polysiloxane fluids having methyl and phenyl radicals; and a minor portion of one of the group of film forming, organic acids and esters thereof consisting of naphthenic acids, oleic acid, and lanolin.

3. A plastic cartridge casing as recited in claim 2 wherein said silicone mixture coating also includes a minor portion of wax.

4. A plastic cartridge casing as recited in claim 3 wherein said silicone mixture coating comprises a dispersion of a major portion of dimethyl silicone fluid and minor portions of paraffin wax and lanolin.

5. A plastic cartridge casing as recited in claim 4 wherein said silicone mixture coating comprises a dispersion of about 82% dimethyl silicone fluid, about 2% paraffin wax, and about 16% lanolin.

6. A plastic cartridge casing as recited in claim 3 wherein said silicone mixture coating comprises a dispersion of a major portion of dimethyl silicone fluid and minor portions of wax and naphthenic acids.

7. A plastic cartridge casing as recited in claim 6 wherein said silicone mixture coating comprises a dispersion of about 66% dimethyl silicone fluid, about 17% paraffin wax, and about 17% naphthenic acids.

8. A plastic cartridge casing as recited in claim 3 wherein said silicone mixture coating comprises a dispersion of a major portion of dimethyl silicone fluid and minor portions of wax and oleic acid.

9. A plastic cartridge casing as recited in claim 8 wherein said silicone mixture coating comprises a dispersion of about 77% dimethyl silicone fluid, about 8% paraffin wax, and about 15% oleic acid.

10. A plastic cartridge casing as recited in claim 2 wherein said silicone mixture coating comprises a dispersion having a major portion of methyl-phenyl silicone fluid and a minor portion of lanolin.

11. A plastic cartridge casing as recited in claim 10 wherein said silicone dispersion includes minor portions of wax.

12. A plastic cartridge casing as recited in claim 2 wherein said silicone mixture coating comprises a solution having a major portion of methyl-phenyl silicone fluid and a minor portion of napthenic acids.

References Cited

UNITED STATES PATENTS

| 1,657,584 | 1/1928 | Peck | 93—83 |
| 1,701,868 | 2/1929 | Willis. | |
| 1,733,177 | 10/1929 | Woodford | 91—68 |
| 1,846,843 | 2/1932 | Carmichael. | |
| 1,972,996 | 9/1934 | Johnson | 102—43 |
| 3,217,648 | 11/1965 | Foote et al. | 102—42 |

BENJAMIN A. BORCHELT, *Primary Examiner.*

R. F. STAHL, *Assistant Examiner.*